United States Patent
Davis, Jr. et al.

[11] Patent Number: 6,089,642
[45] Date of Patent: Jul. 18, 2000

[54] INSTRUMENT PANEL SEAMLESS AIRBAG COVER

[75] Inventors: Joseph J. Davis, Jr., Ortonville; John H. Faarup, Rochester Hills; Jack Palazzolo, Dearborn, all of Mich.

[73] Assignee: Lear Automotive Dearborn, Inc., Southfield, Mich.

[21] Appl. No.: 09/036,762

[22] Filed: Mar. 9, 1998

[51] Int. Cl.[7] .............................. B62D 25/14; B60R 21/16
[52] U.S. Cl. ............................ 296/70; 280/728.3; 296/72
[58] Field of Search .................... 296/72, 70; 280/728.3, 280/732, 731

[56] References Cited

U.S. PATENT DOCUMENTS

| | | | |
|---|---|---|---|
| 3,778,085 | 12/1973 | Lipkin | 280/150 AB |
| 5,110,647 | 5/1992 | Sawada et al. | 428/43 |
| 5,297,813 | 3/1994 | Baba et al. | 280/743 R |
| 5,375,876 | 12/1994 | Bauer et al. | 280/728 B |
| 5,390,950 | 2/1995 | Barnes et al. | 280/728 B |
| 5,431,434 | 7/1995 | Yamakawa et al. | 280/728.3 |
| 5,560,646 | 10/1996 | Gray et al. | 280/728.3 |
| 5,564,731 | 10/1996 | Gallagher et al. | 280/728.3 |
| 5,590,901 | 1/1997 | MacGregor | 280/728.3 |
| 5,626,357 | 5/1997 | Leonard et al. | 280/728.3 |
| 5,772,240 | 6/1998 | Vavalidis | 280/728.3 |
| 5,868,419 | 2/1999 | Taguchi et al. | 280/728.3 |

FOREIGN PATENT DOCUMENTS

| | | |
|---|---|---|
| 0 639 481 | 2/1995 | European Pat. Off. . |
| 0 689 968 | 1/1996 | European Pat. Off. . |
| 43 06 149 | 9/1994 | Germany . |

OTHER PUBLICATIONS

International Search Report, Jul. 21, 1999.

*Primary Examiner*—D. Glenn Dayoan
*Assistant Examiner*—Paul Chenevert
*Attorney, Agent, or Firm*—Brooks & Kushman P.C.

[57] ABSTRACT

A unique flexible hinge member for an instrument panel airbag is formed of a flexible plastic. The flexible hinge member is secured to the under surface of the instrument panel by a welding technique. The instrument panel is formed with a tear seam on its under surface, but no tear seam on its under surface. In one embodiment, the tear seam is h-shaped and two flexible hinge portions are utilized. In another embodiment, the tear seam is u-shaped and a single flexible hinge member is utilized.

14 Claims, 3 Drawing Sheets

INSTRUMENT PANEL SEAMLESS AIRBAG COVER

BACKGROUND OF THE INVENTION

This invention relates to the incorporation of airbag systems into a vehicle trim panel, wherein the panel is provided with a seamless cover over the airbag.

The incorporation of airbags into vehicles has created many design challenges for automotive designers. One challenge is incorporating the airbag into the instrument panel in front of the vehicle passenger seat. One particular challenge is providing an airbag cover that will reliably and safely tear, such that the passenger is protected. It is important that a tear seam be provided in the instrument panel cover to ensure that the airbag will safely deploy. In addition, after deployment it is also important that the torn portions of the airbag cover also provide as much protection to the passenger as possible.

One other design challenge, is that the vehicle designer would like to have a continuous surface on the instrument panel wherever possible. Thus, vehicle designers would prefer not to have a separate airbag cover in the instrument panel. This desire has led to another type of prior art system wherein tear seams were molded into the vehicle instrument panel. The tear seams will tear upon deployment of the airbag, allowing the airbag to deploy. Various configurations of the tear seams are known, including h-shaped, or flap-type.

More recently, there has been an effort to achieve a "seamless" design wherein there is no indication on the outer surface of the instrument panel that the airbag is behind the instrument panel. Thus, any seams or tear strips provided in the instrument panel are only provided on the under surface, and not on the show surface. However, providing appropriate structure for deploying the airbag and tearing through the instrument panel with such systems has not been fully satisfactory.

SUMMARY OF THE INVENTION

In a disclosed embodiment of this invention, a flexible hinge member is placed behind the instrument panel cover around the area where an airbag is to deploy. An under surface of the instrument panel cover is provided with a tear seam. In one embodiment, the tear seam is h-shaped, and in another embodiment the tear seam is u-shaped. The flexible hinge is relatively flexible, and is preferably connected to the instrument panel cover by ultrasonic or vibration welding techniques. These welding techniques provide a very reliable connection ensuring that the flexible hinge and cover will not separate during deployment of the airbag.

In another feature of this invention, the instrument panel is formed of rigid plastic. The rigid plastic has a seamless outer appearance, and the underlying flexible hinge member is relatively flexible. In preferred features of this aspect of the invention, the flexible hinge member slides into structure on the instrument panel to secure the flexible hinge to the instrument panel. Preferably, the flexible hinge member has surfaces that approximately underlie a tear seam on the instrument panel cover over at least three sides. In one embodiment, there is a single flexible hinge member which is c-shaped.

In another embodiment, there are two flexible hinge member parts each covering three sides of a seam, such that in combination the two flexible hinge members provide a h-shape. In one h-shaped embodiment, the two flexible hinge members are formed of a single integral portion formed with a tear seam.

In other features of this invention, an upper flexible hinge member is provided with structure that will cover the tear seam of the instrument panel after deployment. Such structure is particularly valuable when a rigid plastic instrument panel is utilized. This structure protects the passenger during any "secondary" collision after the deployment of the airbag.

These and other features of the present invention can be best understood from the following specification and drawings, the following of which is a brief description.

BRIEF DESCRIPTION OF THE INVENTION

DETAILED DESCRIPTION OF THE PREFERRED EMBODIMENT

Figure 1:
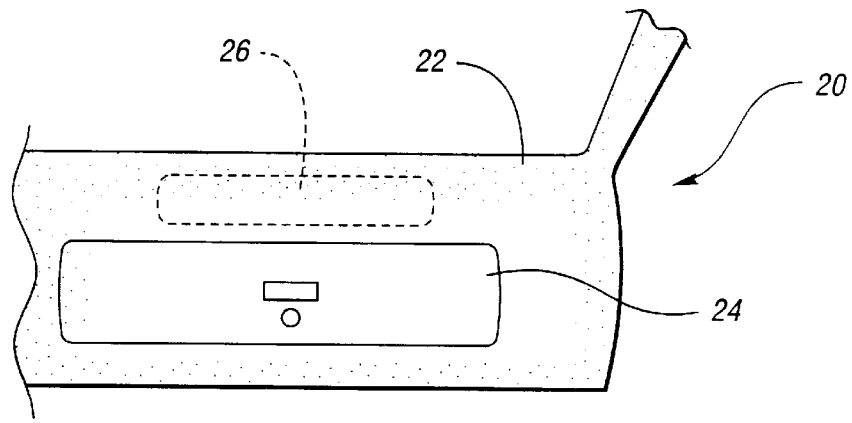
FIG. 1 is a front view of a first type instrument panel.

FIG. 1 shows a vehicle instrument panel 20, having a front or show surface 22 which faces the vehicle passenger compartment. As known, a glove compartment 24 is typically provided in the instrument panel. The instrument panel 20 is of the type which extends generally perpendicularly to the floor of the vehicle. Such instrument panels are often used in trucks. An airbag cover portion 26 is shown in phantom. There will be no seam in the surface 22 in the airbag cover of this invention. The airbag cover portion 26 is shown in phantom to provide an understanding of its location relative to the instrument panel. However, one sitting in the vehicle compartment would not be able to see the airbag cover portion 26, or any related seam.

Figure 2:
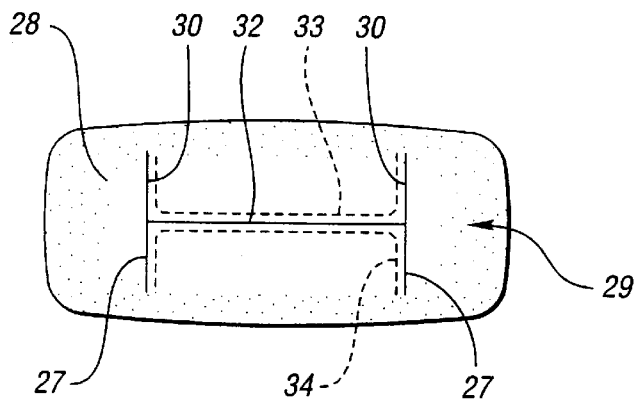
FIG. 2 is a rear view of the airbag cover portion of the FIG. 1 embodiment.

FIG. 2 is a rear view of the instrument panel 20 showing an under surface 28. As shown, a tear seam 29 has an h-shape. Two side portions 27 cooperate with a central portion 32 to provide the h-shape. As shown also in phantom, and as will be described in greater detail below, underlying flexible hinge members 33 and 34 each underlie three sides of the h-shape seam 29. The two flexible hinge members deploy in conjunction to assist in tearing, and supporting the airbag cover position of the instrument panel.

Figure 3:
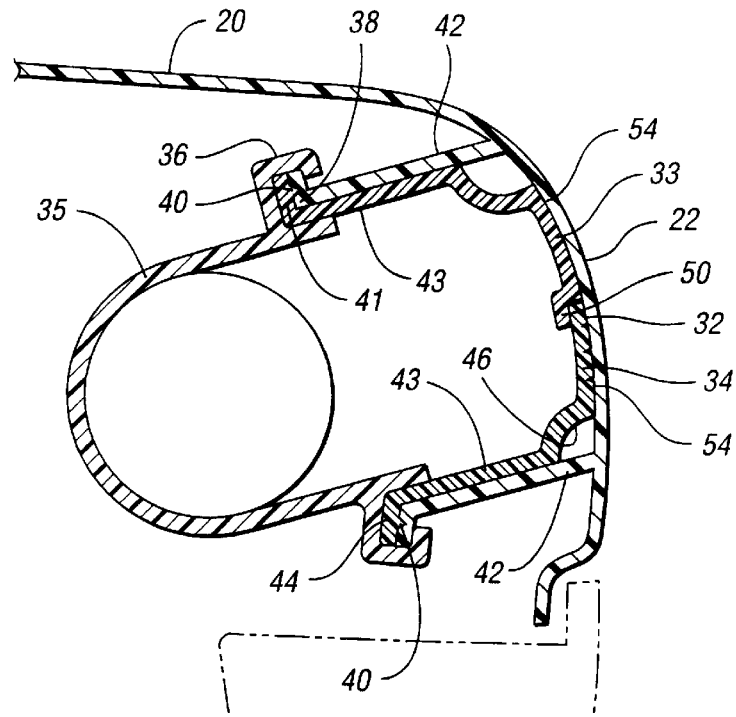
FIG. 3 is a cross-sectional view through the structure for deploying the airbag of FIG. 1.

As shown in FIG. 3, an airbag 35 has feet 36 which slide onto mating portions 38 of the instrument panel 20. Although shown schematically, it should be understood that the airbag 35 would carry an inflator, airbag, etc., as known. This airbag structure is known in the art, and forms no portion of the invention.

As shown, flexible hinge members 33, 34 have beads 40 which are welded to portions 38 of the instrument panel. Feet portions 44 of the flexible hinge carry the beads, to secure the flexible hinge portions to the instrument panel. Side leg portions 42 of the instrument panel underlie side leg portions 43 of the two flexible hinge members 33 and 34.

Hinge joints 46 are formed at each corner of the flexible hinge members 33 and 34. The two flexible hinge members have a generally rectangular front face, and no supporting structure to the lateral sides. The two flexible hinge portions may thus pivot on their hinge joints 46 during deployment.

The flexible hinge 33 has its forward face including a molded flap 50 which moves away from the cover 22 and behind the flexible hinge 34. This feature will provide additional protection to the operator, as will be explained below. As also shown, there is a weld joint 54 securing the flexible hinge members 33 and 34 to the under surface 28 of instrument panel 20. Tear seam 32 is shown relative to the two flexible hinge members. Note that there is some disagreement in the positioning of the flexible hinge member 34 in FIGS. 2 and 3. FIG. 2 is a schematic showing for understanding the general positioning of the flexible hinge members. FIG. 3 shows the preferred positioning of the flexible hinge members.

In assembling this embodiment, the flexible hinge members 33 and 34 are initially placed into the instrument panel. A welding tool then moves into the cavity which will eventually receive the airbag. The flexible hinge members are then welded at 54 to the instrument panel cover. The airbag may then be placed into the arrangement.

Figure 4:
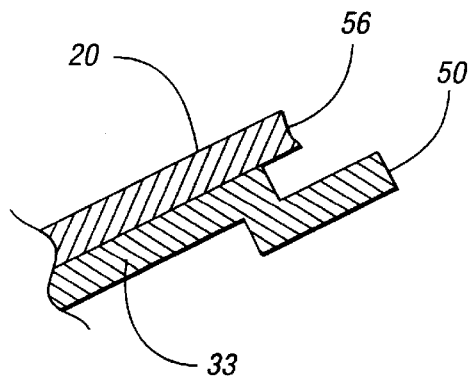
FIG. 4 shows one feature of the FIG. 3 airbag after deployment.

As shown in FIG. 4, the molded flap 50 extends beyond a jagged surface edge tear portion 56 of the instrument panel 20. During some collisions, there may be an initial collision wherein the airbag is deployed, and then a secondary collision. During the secondary collision, if the jagged surface 56 was unprotected, the passenger may contact the jagged edge 56, which is undesirable. The flap 50 may provide additional protection to the passenger and the airbag when deployed.

In a preferred embodiment, the cover 20 is formed of a relatively rigid plastic. The flexible hinge members 33 and 34 are formed of a relatively flexible plastic. In a preferred embodiment, the instrument panel is formed of or injection molded of polycarbonate ABS, one suitable plastic is Pulse 830™, and the flexible hinge members are formed of thermoplastic urethane, one suitable plastic is Pellethane 2103–90A, both plastics are available from Dow Chemical.

Figure 5:
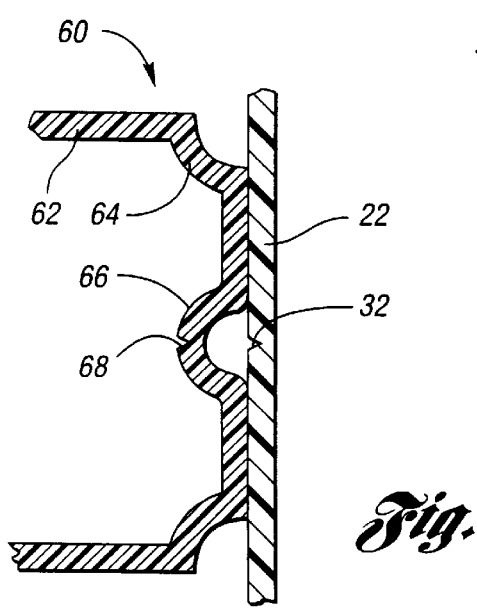
FIG. 5 shows a second embodiment.

FIG. 5 shows a second embodiment wherein the two flexible hinge members are formed as a single part. The flexible hinge may be attached to the instrument panel as in the previous embodiment. Flexible hinge member 60 includes legs 62 extending to hinge joints 64. However, rather than having two separate portions, each portion has an extending flap portion 66 extending to a tear seam 68 and away from the face of the instrument panel. Tear seam 68 extends along a central line between the two connected portions of the flexible hinge member 60 along the horizontal length of the flexible hinge member 60.

Figure 6:
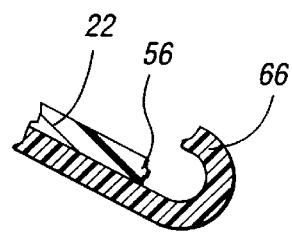
FIG. 6 shows a feature of the FIG. 5 embodiment after deployment.

As shown in FIG. 6, upon deployment of the FIG. 5 embodiment, the torn portion of each flap upper portion will wrap around the jagged surface edge tear portion 56 to provide additional protection during a secondary collision.

Figure 7:
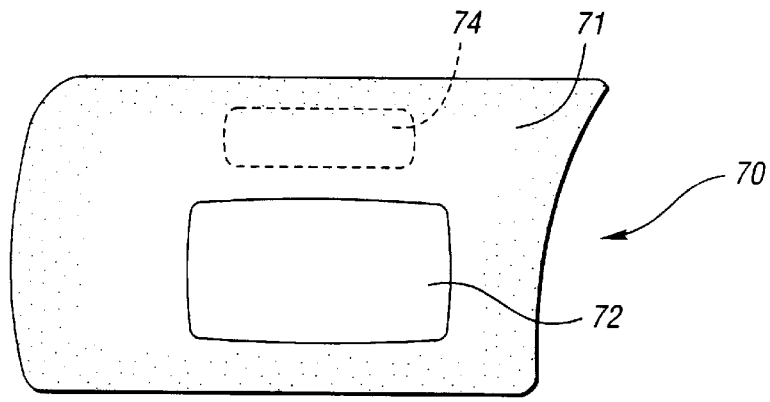
FIG. 7 shows another embodiment instrument panel.

Another instrument panel embodiment 70 is shown in FIG. 7. Instrument panel 70 has show surface 71 with glovebox 72 in a portion which extends generally perpendicular to the vehicle floor; however, the upper portion of the instrument panel 70 extends more parallel to the vehicle floor. The upper portion is not parallel; however, it is less perpendicular than the lower portion. This type of instrument panel is utilized in many automobile instrument panels. As shown, the airbag cover 74 is again incorporated into the instrument panel 70, without a seam being visible on outer surface 71.

Figure 8:
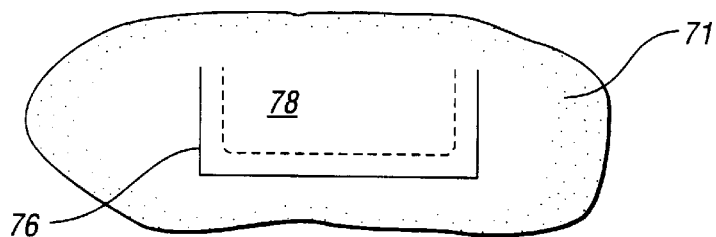
FIG. 8 is a rear view of the airbag cover portion of the FIG. 7 embodiment.

As shown in FIG. 8, the tear strip 76 is generally u-shaped. A flexible hinge member 78 has three sides underlying three sides of the tear strip 76.

Figure 9:
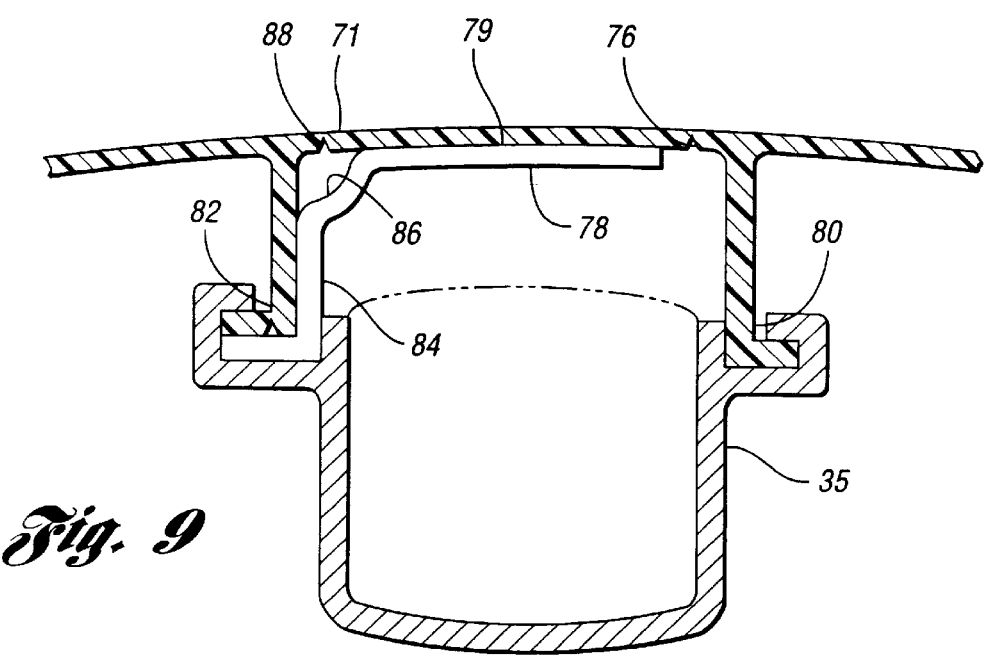
FIG. 9 is a cross-sectional view through the structure of the embodiment for deploying the airbag of FIG. 7.

As shown in FIG. 9, the flexible hinge 78 is attached to the cover by welding 79. A leg 80, which is a lower leg, supports only an airbag structure in this embodiment. The opposed leg 82 includes a support structure for the flexible hinge 78 as in the prior embodiments. A leg 84 of the flexible hinge extends forwardly to a hinge 86, and then to the flexible hinge member 78. As shown, there is an upper hinge joint 88 also molded into the cover 71. It is preferred that the surface is formed into the under surface of the instrument panel to provide tear strips or hinging action or molded, rather than cut, into the rear face.

With this embodiment, when the airbag deploys the flexible hinge is again reliably secured to the cover. The embodiment 70 is particularly useful when the instrument panel is a rigid plastic, or a foam-backed vinyl type instrument panel.

Although welding is discussed, the hinge member can be attached by bonding or mechanically fastened.

Preferred embodiments of this invention have been disclosed; however, a worker of ordinary skill in the art would recognize that certain modifications come within the scope of this invention. For that reason, the following claims should be studied to determine the true scope and content of this invention.

What is claimed is:

1. A vehicle instrument panel comprising:
   an instrument panel body having a tear seam formed in a under surface over an area which is to receive an airbag, said instrument panel body having no corresponding seam on a show surface which is to be visible to an occupant of the vehicle which receives said instrument panel body; and
   a flexible hinge member positioned behind said under surface, said flexible hinge being associated with said tear seam and including two portions, said two portions each having a flap portion positioned adjacent the under surface of the body and extending away from said under surface in a direction toward the airbag at said tear seam, each said flap portion being operable to wrap around a corresponding distal end of a torn portion of the tear seam after deployment.

2. An instrument panel as recited in claim 1, wherein said flexible hinge is connected to said under surface by a welding technique.

3. An instrument panel as recited in claim 1, wherein each of said flexible hinge portions underlie three sides of said tear seam, and said tear seam having a general h-shape.

4. An instrument panel as recited in claim 3, wherein said two portions of said flexible hinge are formed as an integral part with a tear seam between said two portions generally aligned with a central tear seam of said instrument panel.

5. An instrument panel as recited in claim 4, wherein each of said flexible hinge portions has said flap portion.

6. An instrument panel as recited in claim 3, wherein said two flexible hinge portions are formed of separate pieces, with one of said two flexible hinge portions being a vertically upper flexible hinge portion and having said flap portion extending behind the other flexible hinge member.

7. An instrument panel as recited in claim 6, wherein said flexible hinge is formed of a relatively flexible plastic and said instrument panel is formed of a relatively rigid plastic.

8. An instrument panel as recited in claim 1, wherein said flexible hinge has a rear leg extending to connection structure for securing said flexible hinge during deployment of an airbag, and said flexible hinge having a forward face secured to said under surface of said instrument panel, a hinge joint integrally molded into said flexible hinge between said leg and said forward face.

9. An instrument panel as recited in claim 8, wherein said flexible hinge rear leg extends rearwardly to a laterally outwardly extending foot, said foot being secured to a portion of said instrument panel.

10. An instrument panel comprising:

an instrument panel body having a forward face and a rear face, said rear face being formed with a tear seam to facilitate deployment of an airbag, and said forward face not having any tear seam formed therein; and an airbag positioned behind the rear face;

an airbag flexible hinge member having a forward face associated with said rear face of said instrument panel adjacent said tear seam, said flexible hinge being connected to said rear face by a welding technique, said flexible hinge including two portions, at least one of said two portions having a flap portion disconnected from said rear face and positioned between the airbag and the tear seam to prevent contact of the airbag; with the tear seam.

11. An instrument panel as recited in claim 10, wherein each of said flexible hinge portions underlie three sides of said tear seam, said tear seam having a general h-shape.

12. An instrument panel as recited in claim 11, wherein said two portions of said flexible hinge are formed as an integral part with a tear seam between said two portions generally aligned with the central tear seam of said instrument panel.

13. An instrument panel as recited in claim 10, wherein said flexible hinge is formed of a single part, and said tear seam being generally c-shaped.

14. A vehicle instrument panel comprising:

an instrument panel body, having a tear seam formed in an under surface over an area which is to receive an airbag, said instrument panel body having no corresponding seam on a show surface which is to be visible to an occupant of the vehicle which receives said instrument panel body;

a flexible hinge member positioned behind said under surface, said flexible hinge being associated with said tear seam, such that said flexible hinge extends generally along at least three sides of said tear seam, said flexible hinge having at least one leg extending rearwardly and secured to structure on said instrument panel, said flexible hinge having a forward face welded to said under surface, and there being an integrally molded hinge formed between said forward face of said flexible hinge and said rearwardly extending leg, said flexible hinge including two portions, at least one of said two portions having a flap portion spaced away from said under surface of said body at said tear seam in a direction away from the tear seam and toward the airbag, said flap portion being operable to cover a torn portion of the tear seam after deployment.

* * * * *

UNITED STATES PATENT AND TRADEMARK OFFICE
CERTIFICATE OF CORRECTION

PATENT NO.    : 6,089,642
DATED         : July 18, 2000
INVENTOR(S)   : Joseph J. Davis, Jr. et al.

It is certified that error appears in the above-identified patent and that said Letters Patent is hereby corrected as shown below:

<u>Column 4,</u>
Line 56, delete "each".
Line 57, delete "of" and "portions has said flap portions" and insert -- is formed of a relatively flexible plastic and said instrument panel body is formed of a relatively rigid plastic -- after "hinge".

Signed and Sealed this

Twenty-second Day of October, 2002

*Attest:*

*Attesting Officer*

JAMES E. ROGAN
*Director of the United States Patent and Trademark Office*